United States Patent [19]

Reinbold et al.

[11] Patent Number: 4,601,479
[45] Date of Patent: Jul. 22, 1986

[54] COMBINATION SHOPPING CART AND STOCK CART

[75] Inventors: James F. Reinbold, Norman; Clarence W. Upshaw, Tuttle, both of Okla.

[73] Assignee: UNR Industries, Inc., Chicago, Ill.

[21] Appl. No.: 681,135

[22] Filed: Dec. 13, 1984

[51] Int. Cl.⁴ ............................................. B62D 39/00
[52] U.S. Cl. ......................... 280/33.99 H; 280/47.35
[58] Field of Search .................. 280/33.99 R, 33.99 B, 280/33.99 H, 33.99 F, 651, 639, DIG. 4, 47.35; 186/62, 63, 64, 65

[56] References Cited

U.S. PATENT DOCUMENTS

| | | | |
|---|---|---|---|
| 2,596,775 | 5/1952 | Kasper | 280/33.99 H |
| 3,245,498 | 4/1966 | Stanley et al. | 280/33.99 F |
| 3,503,622 | 3/1970 | Romero | 280/33.99 F |
| 3,797,861 | 3/1974 | Shoffner | 280/33.99 |
| 4,116,456 | 9/1978 | Stover et al. | 280/33.99 B |
| 4,273,346 | 6/1981 | Rehrig | 280/33.99 F |
| 4,423,882 | 1/1984 | Stover et al. | 280/33.99 H |

*Primary Examiner*—John J. Love
*Assistant Examiner*—Karin L. Ferriter
*Attorney, Agent, or Firm*—Clement and Ryan

[57] ABSTRACT

A combination shopping cart and stock cart that includes a wheeled chassis providing a carton-carrying platform; a pair of generally vertical upright support posts at the rear of the chassis; an inverted, U-shaped, generally vertical support member the bight of which comprises a horizontal cross support member located forward of the upright support posts; and a generally horizontal side support member on each side of the cart connecting the upright support posts with the outer ends of the bight of the inverted U-shaped support member to provide a side support frame on each side of the cart. A cantilever beam means is pivotally mounted to the two side support frames so as to pivot from a horizontal, operative position to a vertical, out-of-the-way position. In its out-of-the-way position, the cantilever beam means lies substantially entirely outside the vertical space directly above the carton-carrying platform. A lading-carrying basket is secured to the pivoted cantilever beam means to move with that means between its horizontal, operative position and its vertical, out-of-the-way position.

10 Claims, 6 Drawing Figures

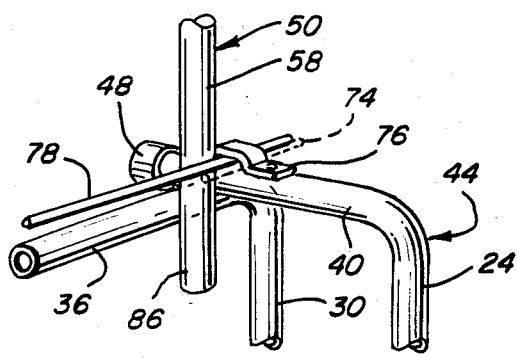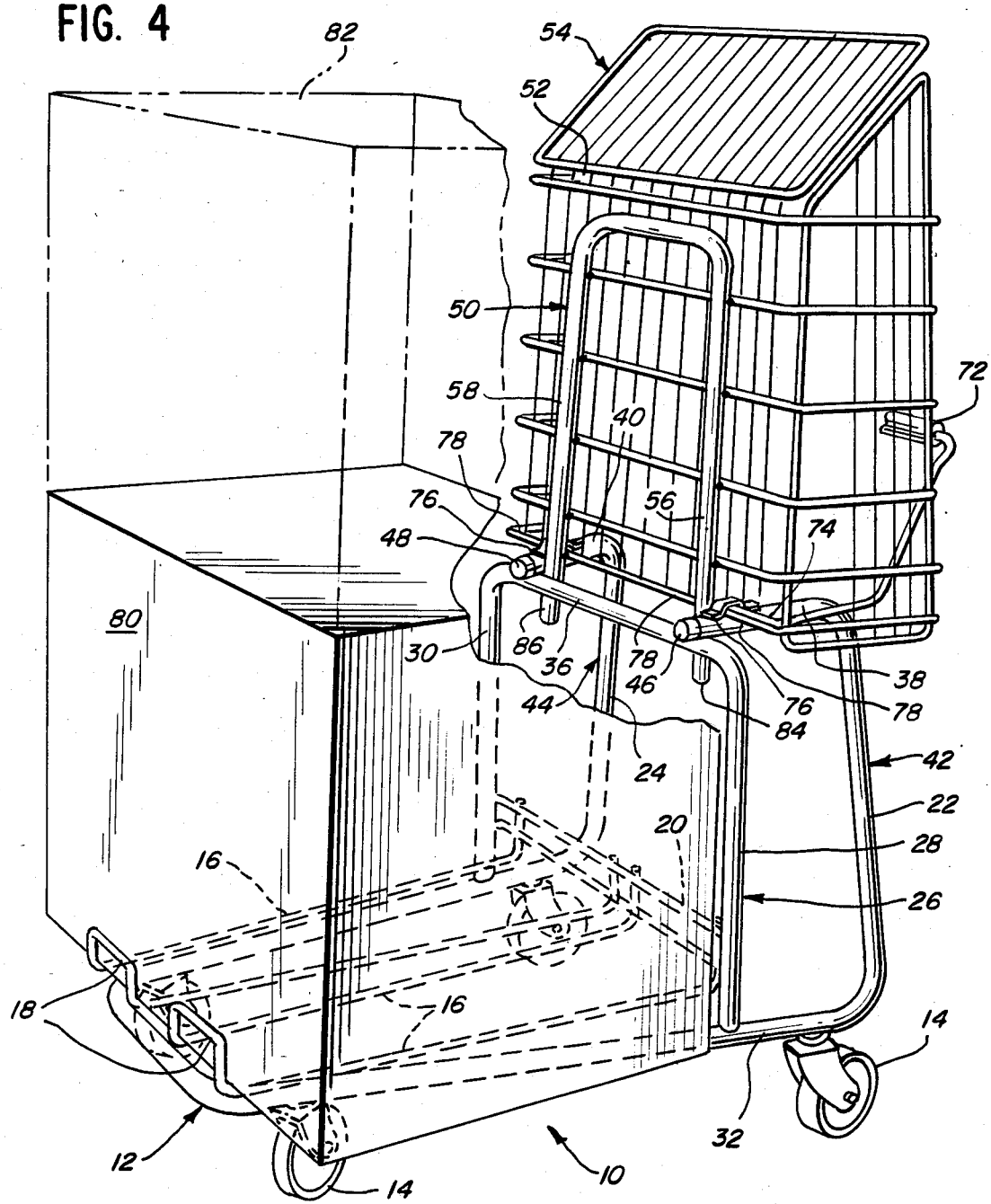

COMBINATION SHOPPING CART AND STOCK CART

This invention relates to a combination shopping cart and stock cart, and in particular one that is capable of being used advantageously as a shopping cart in a typical grocery supermarket, and is also capable of dual use (as either a shopping cart for relatively small items or as a stock cart for larger boxes or cartons) such as will frequently be required in a discount store.

BACKGROUND OF THE INVENTION

Shopping carts for use in grocery supermarkets have been known for many years. Since the 1940's the preferred form of construction, providing the strength necessary to withstand the often rigorous conditions of use of such carts, has included a frame constructed of tubular members, with a forwardly extending, U-shaped, tubular beam providing firm support for the lading-carrying basket.

A form of construction in which the basket can be pivoted upward into an out-of-the-way position for storage became popular when so-called over-the-counter shopping carts were introduced for use in supermarkets in the early 1960's. With this pivoted construction, it was necessary to extend the cantilever beam supporting the basket quite far forward in order to provide the support necessary for the basket in its horizontal, operative position. Examples of such carts are the carts disclosed in U.S. Pat. Nos. 3,245,498 issued to Stanley et al. on Apr. 12, 1966; 3,503,622 issued to Romero on Mar. 31, 1970; 4,116,456 issued to Stover et al. on Sept. 26, 1978; 4,273,346 issued to Rehrig on June 16, 1981; and 4,423,882 issued to Stover et al. on Jan. 3, 1984.

Shopping carts with the pivoted basket construction described have had two shortcomings from their very first introduction over 20 years ago. With those carts that provided auxiliary lower platforms to provide supplementary lading-carrying space, unloading from such platforms was oftentimes inconvenient because of the impediment to access to the lower platform that was presented by the forwardly extending cantilever beam. A second problem was peculiar to so-called discount stores, because the forwardly extending cantilever beam made it impossible to place boxes or cartons of any substantial height on the lower platform, and thus the only way to transport such items with this cart was to lift them up and place them on top of the basket, which was very difficult with many large, heavy items, and often produced a precariously balanced load on top of the cart.

Large stores that sell branded goods—such as consumer durables—at a discount from list prices have been known at least since shortly after the end of the Second World War, and such stores, which are usually located in or around large urban areas, have been very common since sometime in the 1950's. The goods sold in discount stores usually include, among other things, household appliances of various sorts (such as TV sets, clothes washing and drying machines, dishwashers, etc.), furniture of various sizes, cooking grills, and other items of substantial size that may be packaged in quite large corrugated cardboard boxes or cartons. A dolly or stock cart of one description or another has often been used to carry such items from the floor of the discount store to a waiting automobile, truck or van parked in the store parking lot.

Conventional shopping carts have sometimes been used in discount stores to carry items of smaller size from the point of purchase out of the store to the parking lot. The use of shopping carts of this type has, however, of necessity been limited to relatively small items, because even when platforms have been provided at a low level to supplement the lading-carrying space of the shopping basket itself, as already mentioned it has not been possible to place large cartons on such platforms because either the shopping basket or the tubular supporting structure (in a collapsible, telescoping shopping cart) has interfered, and thereby limited the height of the box or carton that can be accommodated.

Because discount stores frequently have a limited number of smaller items for which a conventional shopping cart is useful and because, for the reason given, such a cart is not adapted to carrying many larger items contained in large boxes or cartons, shopping carts of this type have found limited acceptance in discount stores. In order to take care of the problem of transporting items contained in large cartons to the front of the store and out to the parking lot, discount stores have usually relied on stock carts of conventional construction such as a dolly or flatbed cart, and relatively few discount stores have met the dual problems discussed by providing their customers with both conventional shopping carts and conventional stock carts.

The use of two types of carts is complicated and expensive, but if the two types are not used one or the other of the problems of transporting items purchased in the discount store cannot be met. Despite these facts, so far as applicants are aware no one prior to their invention had developed a strongly constructed combination shopping cart and stock cart that can be quickly converted from one function to the other, and thus meet both the problems referred to with a minimum of equipment cost.

The shopping cart disclosed in Shoffner U.S. Pat. No. 3,797,861 is the only cart known to applicant that permits the lading-carrying basket to be swung up entirely out of the way, but that cart omits applicants' important cantilever beam, and relies entirely on various types of abutment means (122, 198, 228 and 320) to provide a stop against movement beyond the horizontal of a pivoted shopping basket as it swings down from its tilted position around a pivot means (106, 186, 218 and 306, respectively), in order to support the basket in its forwardly extending, operative position.

Applicants' cart overcomes all the problems discussed, whether they are presented in a grocery supermarket or in a discount store.

SUMMARY OF THE INVENTION

The combination shopping cart and stock cart of this invention includes a wheeled chassis that provides a carton-carrying platform on which large packages, boxes or cartons can be carried. The chassis and the framework carried by it are of strong, preferably tubular and wire, construction.

The cart includes a pair of generally vertical upright support posts carried by the chassis at its rear end, one of the posts being located on each side of the chassis. An inverted, U-shaped, generally vertical support member is also carried by the rear portion of the chassis, well back of the fore-and-aft midpoint of the chassis, with the bight of the inverted U forming a horizontal cross support member located forward of the upper ends of the pair of upright support posts that are located at the rear end of the cart.

A generally horizontal side support member is provided on each side of the cart. This support member connects each of the rear upright support posts with the inverted U-shaped support member, preferably with the bight of the U-shaped member. This provides a side support frame on each side of the cart.

Cantilever beam means is pivotally mounted on the two side support frames to pivot, from a generally horizontal, operative position extending forward of the inverted U-shaped vertical support member, to a substantially vertical, out-of-the-way position above the U-shaped support member, and back again. The pivot axis of the pivoted cantilever beam is located rearward of the horizontal cross support member that is formed by the bight of the inverted U-shaped support member.

The cart is completed by a basket defining a lading-carrying space. The basket is secured to the pivoted cantilever beam so as to be supported by that beam selectively in either its generally horizontal, operative position or its substantially vertical, out-of-the-way position. The rear end of the basket is located substantially at the pivot axis of the mounting between the pivoted cantilever beam and the two side support frames.

As a result of the construction described, the basket of the shopping cart is supported on a strong cantilever beam, which in turn is supported on a strong side support frame on each side of the cart. Thus the shopping cart basket can be filled safely with a large number of products that together add up to quite a heavy load.

At the same time, when it is desired to do so, the cantilever beam that provides the strong support for the basket can be pivoted upward into an out-of-the-way position so that a large box or carton can be placed upon the lower carton-carrying platform and—because the two side support frames of the cart are carried by the rear portion of the chassis—there is no structure that intrudes substantially on the vertical space directly above that platform, and thus no structure that interferes with positioning the box or carton on the platform. In addition, because the carton-carrying platform is located at a low level, it is not necessary to lift the large box or carton up onto the basket of the shopping cart, even when the box or carton is of only moderate size and therefore might conceivably be laid on top of the basket if the user of the cart was careful to balance the box or carton in that somewhat precarious position.

This specification discloses the preferred structure connecting the cantilever beam and the generally horizontal side support members.

It also discloses a preferred form of the cart in which the cantilever beam has a portion that extends rearward beyond the pivot axis of the mounting between the beam and the generally horizontal side support members, and a further preferred form in which the stop means comprises a baby seat secured at the rear of the cart to the side support member.

To prevent the cantilever beam and basket carried by it from falling down accidentally from its substantially vertical, out-of-the-way position, catch means is provided near the top of at least one of the vertical legs of the inverted U-shaped forward support member.

Besides providing a single cart that performs the function of a conventional shopping cart and the additional function of a conventional stock cart, the construction described makes it possible, as will be seen, to nest the carts together when it is desired to store them between occasions of use.

BRIEF DESCRIPTION OF THE DRAWING

The invention will now be described by reference to the accompanying drawing, in which:

FIG. 3 is a fragmentary three-quarter perspective view of the embodiment of FIG. 1, with the safety catch omitted for clarity;

FIG. 4 is a three-quarter perspective view of the embodiment of FIG. 1 showing a carton of one size in solid line carried by the lower platform of the cart and a taller carton in phantom, with a fragmentary showing of the handle for the cart, and the baby seat omitted for clarity; and FIG. 5 (on the same sheet as FIG. 1) is a sectional view, taken along the line 5—5 in FIG. 2A, giving a plan view of a safety catch that may be used with the cart of FIG. 1.

DESCRIPTION OF ONE EMBODIMENT

One embodiment of the combination shopping cart and stock cart of this invention will now be described by reference to the accompanying drawing.

Lower Carton-Carrying Platform

Figure 1:
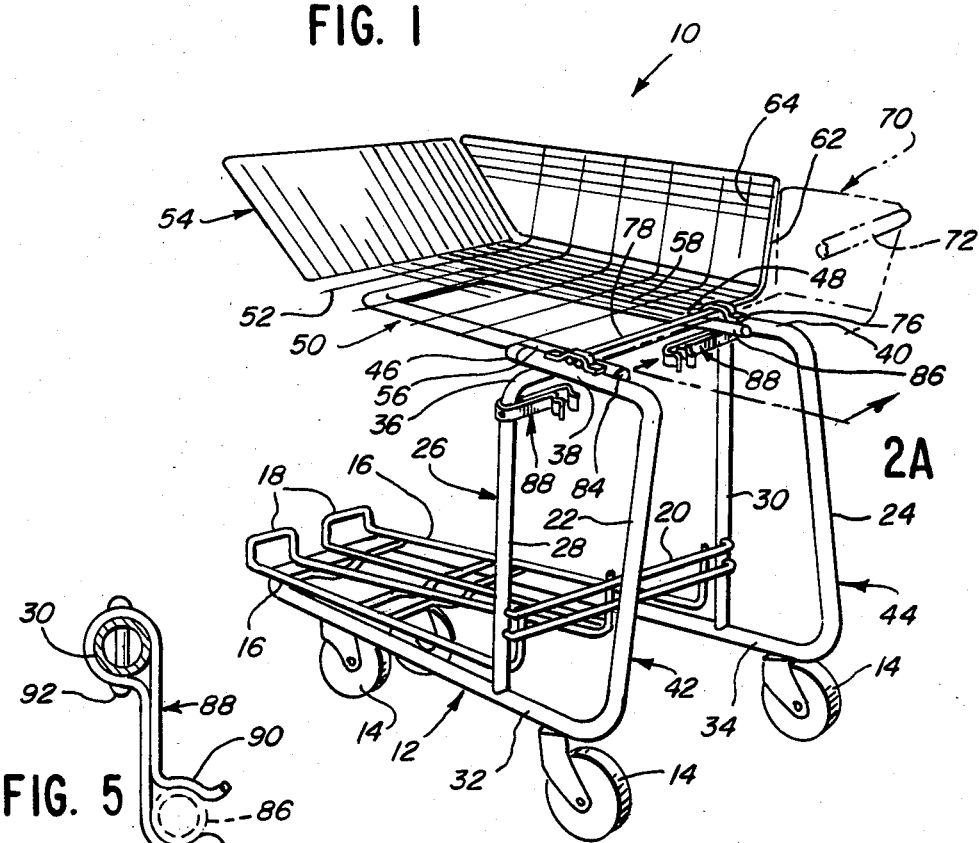
FIG. 1 is a fragmentary, three-quarter perspective view of one embodiment of the combination shopping cart and stock cart of this invention, in which for clarity a portion of the wire basket is omitted and only small portions of the baby seat and the handle for the cart are indicated in phantom.

FIG. 1 is a three-quarter perspective view of one embodiment of the combination cart of this invention, with parts of the wire basket, baby seat and cart handle omitted for clarity.

Cart 10 includes chassis 12 mounted on wheels 14. This wheeled chassis carries carton-carrying platform 16, which in this embodiment is fixedly secured to the chassis.

At the forward end of platform 16, upwardly extending stop members 18 prevent boxes or cartons carried by platform 16 from sliding off the front of the cart. Retainer wall 20 performs the same function, at the rear of platform 16, with respect to cartons that may not be wide enough or tall enough to be barred by the rest of the cart framework from sliding off the platform to the rear.

Side Support Frames

A pair of generally vertical upright support posts 22 and 24 are carried by chassis 12 at the rear thereof, one on either side of the chassis. In the embodiment shown, posts 22 and 24 are arranged in substantially vertical positions. They may, if desired, be arranged in slanting positions, such as to the front or to the rear, so long as neither the top end nor the bottom end of the post extends so far forward as to interfere with the use of carton-carrying platform 16 as described below.

Inverted, U-shaped, generally vertical support member 26 is carried by the rear portion of chassis 12, well behind the fore-and-aft mid-point of the cart. U-shaped support member 26 is preferably integrally formed of tubular construction, as is the case with the embodiment disclosed in the drawing, but it may be constructed in any other suitable manner if desired.

This inverted U-shaped member includes downwardly extending legs 28 and 30, which are fixedly attached at their bottom ends to longitudinal members 32 and 34, respectively, of chassis 12. Bight 36 extends between the upper ends of downwardly extending legs 28 and 30 of support member 26. Bight 36 comprises a horizontal cross support member that is located forward of the upper ends of upright support posts 22 and 24.

In the embodiment disclosed, downwardly extending legs 28 and 30 of the inverted U-shaped support member are arranged in substantially vertical positions. Like upright support posts 22 and 24, legs 28 and 30 may, if desired, be arranged in slanting positions, such as to the front or to the rear, so long as no portion of the legs extends forward so far as to interfere with the operation of the cart as described below.

Generally horizontal side support members 38 and 40 are positioned on each side of cart 10 connecting upright support posts 22 and 24, respectively, with the outer end portions of the bight of inverted U-shaped support member 26. The described structure provides side support frames 42 and 44 on each side of cart 10, rising from and supported by chassis 12. It is preferred, as shown in the embodiment disclosed, that the top surfaces of side support members 38 and 40 are positioned throughout their extent at a level above the top surface of bight 36 of inverted U-shaped support member 26.

As mentioned above, upright support posts 22 and 24 and inverted U-shaped support member may, if desired, be arranged in slanting positions. Although the fabrication will be more complicated, the bottom ends of posts 22 and 24 may be moved forward, for example, and the bottom ends of downwardly extending legs 28 and 30 may be moved backward, to form two X-shaped support frames rising on each side from chassis 12. As will be seen, this form of construction would make somewhat more space available at the vertical midpoint of the resulting side support frames to accommodate irregularly shaped packages that protruded rearwardly at that level.

As will be seen, front ends 46 and 48 of side support members 38 and 40, respectively, extend only a short distance forward of horizontal cross support member 36, in order not to interfere with the use of lower carton-carrying platform 16, to be described below.

Cantilever Beam

Cantilever beam member 50, which extends forward to a point adjacent front end 52 of wire basket 54, provides a strong support for the basket. In the embodiment shown, cantilever beam 50 is a U-shaped member with its open end facing to the rear. It is located in the cart shown in a position inboard of side support members 38 and 40.

Beam 50 is pivotally mounted at its free ends or rear end portions 56 and 58, respectively, on side support frames 42 and 44, preferably (as shown) on side support members 38 and 40, with rear end portions 56 and 58 lying at a level below the top surfaces of side support members 38 and 40 and above the top surface of bight 36 of inverted U-shaped support member 26. The pivotal mounting of cantilever beam 50 is best seen in FIGS. 2A and 2B, where pivot axis 78 is seen to be located at a level above the top surfaces of side support members 38 and 40.

As thus mounted, cantilever beam 50 pivots, from a generally horizontal, operative position extending forward of inverted U-shaped support member 26 (as seen in FIG. 1), to a substantially vertical, out-of-the-way position above inverted U-shaped support member 26 (as best seen in FIG. 4), and back again. Pivot axis 60 of pivoted cantilever beam 50 is located rearward of horizontal cross support member 36 (FIGS. 2A and 2B).

Figure 2A:
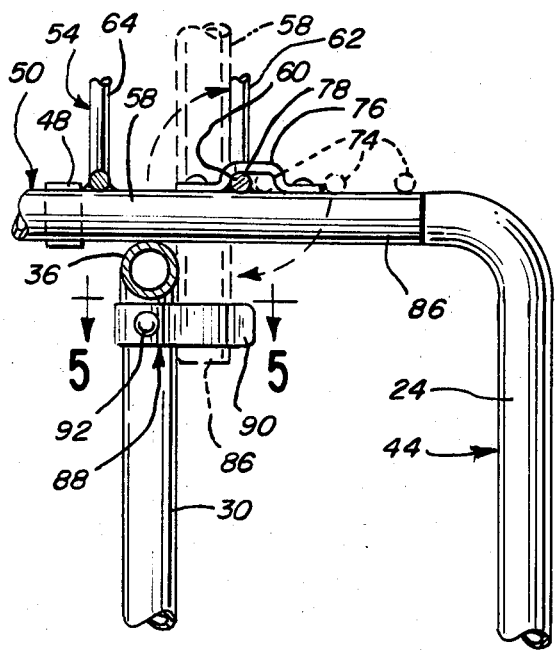
FIG. 2A is a fragmentary sectional view of the embodiment of FIG. 1, taken substantially along the line 2A—2A in the latter Figure, with the cantilever beam supporting the wire basket shown in solid line in its horizontal, operative position and in phantom line in its vertical, out-of-the-way position.

FIG. 2A is a sectional view of cart 10 taken generally along line 2A—2A of FIG. 1. In this Figure, free end 58 of U-shaped cantilever beam 50 is shown in solid line in its generally horizontal, forwardly extending, support position for the basket. FIG. 2B shows member 58 after it has been pivoted upward into its substantially vertical, out-of-the-way position.

Figure 2B:
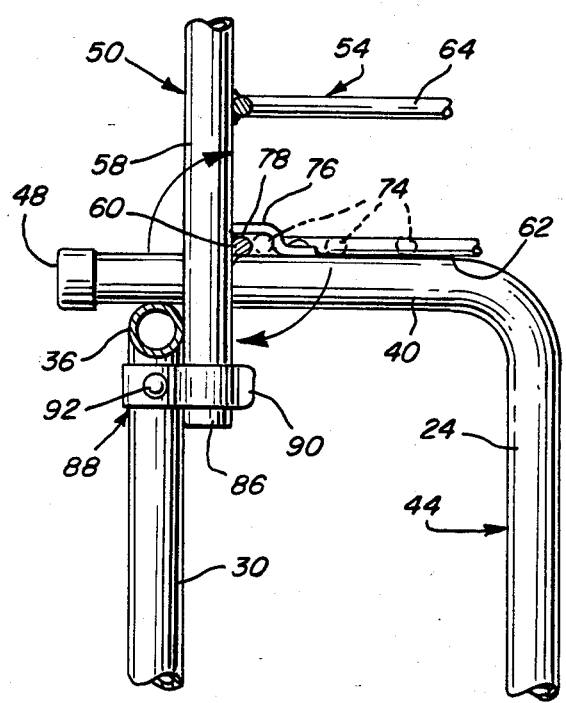
FIG. 2B is a similar view showing the cantilever beam supporting the wire basket after it has been pivoted into its vertical, out-of-the-way position.

FIG. 3 is a simplified, three-quarter perspective view of the structure shown in FIG. 2B, with various parts omitted for clarity. Free end 58 of cantilever beam 50 is welded or otherwise securely attached to wire pivot member 78 of the wire basket. Beam 50 pivots about pivot wire 78, which is journaled in bracket 76 carried by side support member 40 of side frame 44. As shown in phantom, in this embodiment cross wire 74 of the bottom wall of baby seat 70 is also confined by bracket 76.

Basket And Baby Seat

In the embodiment shown, basket 54 is of conventional wire construction and defines a lading-carrying space. The basket is secured, as by welding, to pivoted cantilever beam 50 so as to be supported by the beam selectively in either its generally horizontal, operative position as seen in FIG. 1 or its substantially vertical, out-of-the-way position as seen in FIG. 4.

Rear end 62 of basket 54 is located substantially at pivot axis 60 of the mounting between pivoted cantilever beam 50 and the two side support frames 42 and 44.

As best seen in FIGS. 2A and 2B, for added strength of rear portion 62 of basket 54, an extra cross wire 64 may be provided adjacent the open rear end of the basket. For clarity, extra cross wire 64 is only partially shown in FIG. 1, and the wire is omitted from FIG. 4.

When the shopping cart of this invention includes, as in the embodiment shown in the drawing and described in this specification, a baby seat at the rear of the cart for an infant or child of tender years, the basket and baby seat are arranged to nest together when the basket is pivoted up from its generally horizontal, forwardly extending, operative position to its substantially vertical, out-of-the-way position. In the embodiment shown, basket 50 is open at its rear end, and the width of baby seat 70 is less than the width of basket 54, which permits the basket to be moved up into its vertical position as shown in FIG. 4.

Baby seat 70 is illustrated in a fragmentary showing and in phantom in FIG. 1, and is omitted entirely for clarity from FIG. 4. Handle 72 is shown in phantom in FIG. 1 and in a fragmentary showing in FIG. 4. Some of the bottom cross wires 74 of baby seat 70 are shown in phantom in FIGS. 2A and 2B.

Horizontal Cross Support Member

The function of horizontal cross support member 36 can be best seen from FIGS. 2A and 4.

Looking first at FIG. 4, cantilever beam 50 has been pivoted up about wire pivot member 78 into its substantially vertical, out-of-the-way position, carrying with it wire basket 54. Basket 54 has nested with baby seat 70 (not shown in this Figure). In this position, cantilever beam 50; wire basket 54; front ends 46 and 48, respectively, of generally horizontal side support members 38 and 40; and inverted U-shaped support member 26 are all positioned well back of the fore-and-aft mid-point of cart 10, in out-of-the-way positions.

With the cart in this condition, large box or carton 80 (in solid line) or 82 (shown in phantom) can be carried on carton-carrying platform 16 at chassis level. When carton 80 or 82 is removed from platform 16, cantilever beam 50 and basket 54 can be pivoted down around pivot wire 78 until beam 50 abuts horizontal cross support member 36.

In the latter condition, pivoted cantilever beam 50 is firmly supported by horizontal support member 36 and pivot wire 78 journaled in brackets 76, which are securely attached to side members 38 and 40. In the preferred form of the invention (as seen in FIG. 2A and as will be explained in more detail below), cantilever beam 50 is also firmly supported by cross wires 74 in at least a portion of the bottom wall of baby seat 70.

Stop Means

As seen in FIGS. 1-4, free ends 56 and 58 of pivoted cantilever beam 50 preferably have portions 84 and 86, respectively, that extend rearward beyond pivot axis 60 of the mounting between beam 50 and generally horizontal side support member 38 and 40 when beam 50 is in its forwardly extending, generally horizontal, operative position. The distance that portions 84 and 86 extend to the rear beyond pivot axis 60 is relatively short with respect to the distance that cantilever beam 50 and basket 54 secured thereto extend forward of the pivot axis.

As explained above, the portion of pivoted cantilever beam 50 that lies rearward of horizontal cross support member 36 is restrained from upward movement—when basket 54 is in its generally horizontal, operative position—at least by pivot wire member 78 journalled in brackets 76 on side support members 38 and 40. In the preferred form of the cart of this invention, additional stop means is carried by side support members 38 and 40 for abutment by rearwardly extending portions 84 and 86 of cantilever beam 50 whenever the beam is pivoted down into its generally horizontal position.

The preferred location for the additional stop means is directly above side support members 38 and 40, at the level of the top surface of those side support members, extending across from one side support member to another. The preferred form of the additional stop means is the bottom wall of baby seat 70, against whose cross wires 74 rearwardly extending portion 86 of free end 58, for example, of cantilever beam 50 abuts as described above and shown in FIG. 2A.

Safety Catch

As shown in FIGS. 1, 2A, 2B and 5, catch means 88 is provided at the upper ends of downwardly extending legs 28 and 30 of the inverted U-shaped support member 26. Catch means 88 releasably engages rearwardly extending portions 84 and 86, respectively, of free ends 56 and 58 of cantilever beam 50 when wire basket 54 is elevated into its substantially vertical, out-of-the-way position, thus avoiding accidental dropping of the wire basket from its vertical position.

Catch means 88 is constructed of spring steel or other suitable material. Flexible fingers 90 are spread open to accept and releasably engage rearwardly extending portion 86 of free end 58 of cantilever beam 50 (as shown in phantom in FIG. 5) whenever member 50 is raised to its vertical position. Each finger 90 is securely attached to downwardly extending lug 28 or 30, as the case may be, of inverted U-shaped support member 26 by means of rivet 92 or other suitable attachment.

The above detailed description is given for clearness of understanding only. No unnecessary limitations should be understood therefrom, as modifications will be obvious to those skilled in the art.

We claim:

1. A combination shopping cart and stock cart which comprises:
    (a) a wheeled chassis providing a carton-carrying platform;
    (b) a pair of generally vertical upright support posts carried by said chassis at the rear thereof, one on either side of the chassis;
    (c) an inverted, U-shaped, generally vertical support member carried by the rear portion of said chassis, the bight between the downwardly extending legs of said inverted U-shaped support member comprising a horizontal cross support member that is located forward of the upper ends of said pair of upright support posts;
    (d) a generally horizontal side support member on each side of the cart connecting each of said rear upright support posts with the outer end portions of the bight of said inverted U-shaped support member to provide a side support frame on each side of the cart;
    (e) cantilever beam means pivotally mounted to said two side support frames to pivot from a generally horizontal, operative position extending forward of said inverted, U-shaped, vertical support member, said cantilever beam means being supported in said operative position by said horizontal cross support member and said pivotal mounting to said side support frames, to a substantially vertical, out-of-the-way position above said U-shaped support member, in which position said cantilever beam means lies substantially entirely outside the vertical space directly above said carton-carrying platform on the wheeled chassis of the cart, and back again, the pivot axis of said pivoted cantilever beam means being located rearward of said horizontal cross support member; and
    (f) a basket defining a lading-carrying space, said basket being secured to said pivoted cantilever beam means so as to be supported by the latter selectively in either said generally horizontal, operative position of the cantilever beam or said substantially vertical, out-of-the-way position of the cantilever beam, with the rear end of said basket located substantially at said pivot axis of the mounting between said pivoted cantilever beam means and said two side support frames.

2. The combination shopping cart and stock cart of claim 1 in which the top surfaces of said side support members are positioned throughout their extent at a level above the top surface of the bight of said inverted U-shaped vertical support member.

3. The combination shopping cart and stock cart of claim 2 in which said cantilever beam means is pivotally mounted to said two side support members.

4. The combination shopping cart and stock cart of claim 3 in which the rear end portion of said cantilever beam means lies at a level below the top surfaces of said side support members and above the top surface of the bight of said inverted U-shaped vertical support member.

5. The combination shopping cart and stock cart of claim 3 in which said pivotal mounting of the cantilever beam means to said two side support members is located at a level above the top surfaces of said two members.

6. The combination shopping cart and stock cart of claim 1 in which:
   (a) said cantilever beam means is pivotally mounted to said two generally horizontal side support members;
   (b) said pivoted cantilever beam means has a portion that extends rearward beyond said pivot axis of the mounting between said beam and said generally horizontal side support members, for a distance that is relatively short with respect to the distance said means and said basket secured thereto extend forward of said pivot axis, when said beam means is in its forwardly extending, substantially horizontal, operative position; and
   (c) stop means is carried by said two side support members for abutment by said rearwardly extending portion of the pivoted cantilever beam means when the beam means is pivoted down into its said generally horizontal position, said stop means being located rearward of said pivot means,
whereby said contilever beam means is supported in its said forwardly extending, generally horizontal, operative position by said horizontal cross support member and by said stop means.

7. The combination shopping cart and stock cart of claim 6 in which said stop means is positioned directly above said side support members and extends across from one of said side support members to the other.

8. The combination shopping cart and stock cart of claim 7 in which:
   (a) said stop means comprises a baby seat secured at the rear of the cart to said generally horizontal side support members;
   (b) said lading-carrying basket and said baby seat are arranged to nest together when the basket is pivoted up from its generally horizontal, forwardly extending, operative position to its substantially vertical, out-of-the-way position; and
   (c) said rearwardly extending portion of said pivoted cantilever beam means abuts the bottom of said baby seat when said lading-carrying basket is pivoted down into its said forwardly extending, generally horizontal, operative position.

9. The combination shopping cart and stock cart of claim 8 in which:
   (a) said lading-carrying basket is open at its rear end; and
   (b) the width of said baby seat is less than the width of said lading-carrying basket.

10. The combination shopping cart and stock cart of claim 6 in which catch means is positioned near the top of at least one of the vertical legs of said inverted U-shaped forward support member, to releasably engage said rearwardly extending portion of the pivoted cantilever beam means when said lading-carrying basket is elevated into its said substantially vertical, out-of-the-way position.

* * * * *